Sept. 14, 1943.  H. P. KUEHNI  2,329,541
ELECTRIC MEASURING APPARATUS
Filed June 18, 1941   2 Sheets-Sheet 1

Inventor:
Hans P. Kuehni,
by Harry E. Dunham
His Attorney.

Sept. 14, 1943.  H. P. KUEHNI  2,329,541
ELECTRIC MEASURING APPARATUS
Filed June 18, 1941  2 Sheets-Sheet 2

Inventor:
Hans P. Kuehni,
by Harry E. Dunham
His Attorney.

Patented Sept. 14, 1943

2,329,541

UNITED STATES PATENT OFFICE 2,329,541

ELECTRIC MEASURING APPARATUS

Hans P. Kuehni, Schenectady, N. Y., assignor to General Electric Company, a corporation of New York Application June 18, 1941, Serial No. 398,579

6 Claims. (Cl. 265—1)

My invention relates to an electric measuring apparatus, and although not limited thereto it has application to a machine tool force measuring gage of the electromagnetic type.

An object of my invention is to provide an improved measuring apparatus of the above-mentioned type which is simple in construction, reliable in operation, and easy to manufacture.

Another object of my invention is to provide an electric measuring device having an improved gage head for measuring the components of force applied to a member, along a plurality of axes.

A further object of my invention is to provide an improved machine tool force measuring gage for simultaneously measuring the feed pressure and cutting pressure of a tool bit.

Further objects and advantages of my invention will become apparent from the following description referring to the accompanying drawings, and the features of novelty which characterize my invention will be pointed out with particularity in the claims annexed to and forming a part of this specification.

Figure 1:
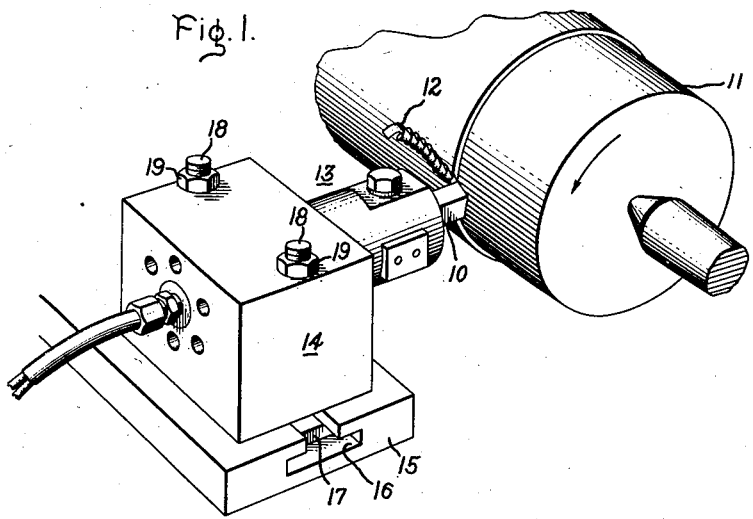
Figure 2:
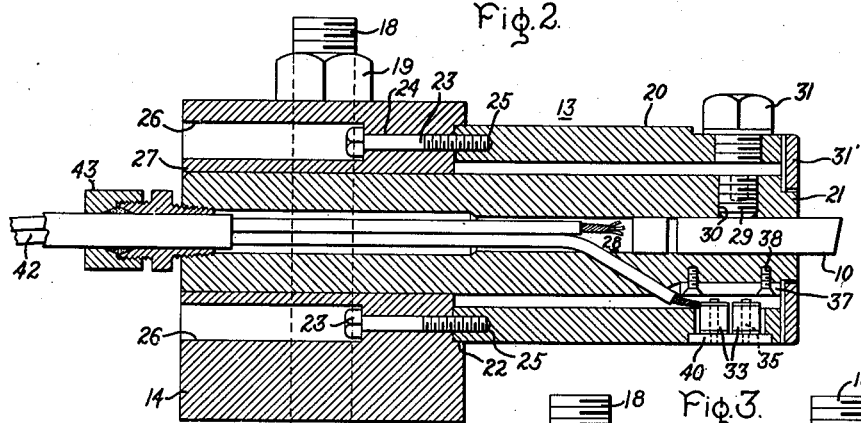
Figure 4:
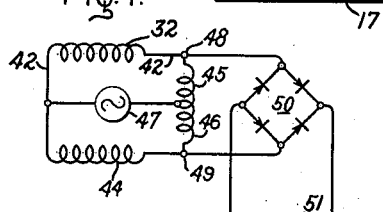
Figure 5:
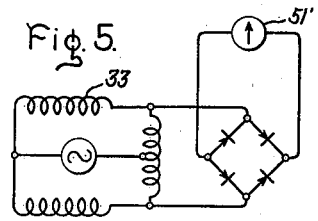
Figure 3:
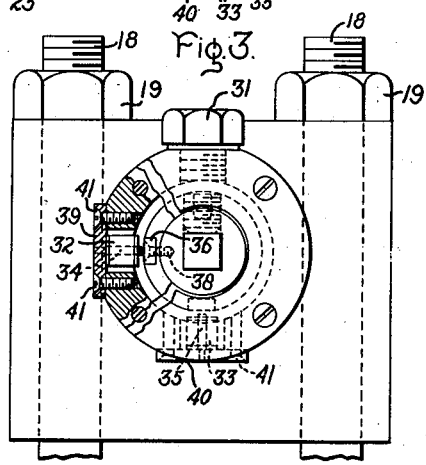
Figure 6:
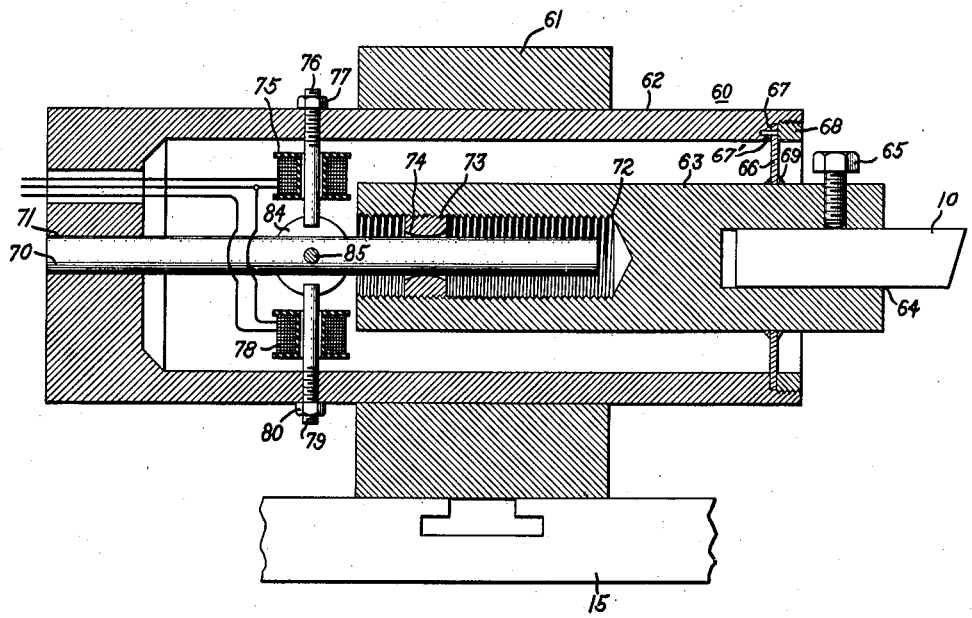

In the drawings, Fig. 1 is a perspective view of a machine tool force measuring gage holding a tool bit which is cutting a shaving from a work piece, the gage being provided with an embodiment of my invention; Fig. 2 is a sectional side elevation of the gage head illustrated in Fig. 1; Fig. 3 is an end view in partial section, illustrating one of the gage coils and cooperating armature, of the gage head illustrated in Fig. 2; Figs. 4 and 5 illustrate diagrammatically electrical circuits for obtaining electrical indications proportional to the feed pressure and cutting pressure of the bit carried by my improved machine tool force measuring gage; Fig. 6 illustrates a modification of the machine tool force measuring device illustrated in Figs. 1, 2, and 3, and Fig. 7 illustrates diagrammatically an electrical circuit for obtaining indications proportional to components of force acting on the tool bit.

In the arrangement illustrated in the drawings, I have provided a machine tool force measuring or pressure gage with a gage head having a plurality of gage coils supported by a body portion on mutually perpendicular axes in a plane, and a member having a plurality of armatures adjacent the gage coils and cooperable magnetically therewith. The body portion and member are in the form of two concentric members, the tool bit being carried by the inner member so that upon movement of the tool pressure gage and bit bodily along an axis and upon rotation of the work piece, relative movement will be caused between the armatures and the coils due to contact between the bit and work piece, which will vary the reactance of the coils. This variation in reactance will produce a change in the current passing through the gage coils proportional to the amount of relative movement between the concentric members along the axes. In the application of my invention to a machine tool force measuring gage, the gage devices with the coils are disposed along mutually perpendicular axes, that is, along an axis parallel with the axis of bodily movement of the gage head along the work piece for measuring feed pressure, and along an axis perpendicular thereto for measuring cutting pressure. It is to be understood, however, that the magnetic members and gage coils may be placed along any suitable number of axes which have any suitable relationship to each other, for measuring the components of the force along these axes, and it is also to be understood that my invention has application to any measuring device in which it is desired to measure one or all of the components of a force which is acting upon a member. With these coils suitably connected in bridge circuits, the change in reactance of one of the coils will give an indication of the movement along that axis, while the change in reactance of the other coil will give an indication of the relative movement between the tubular members along another axis. Such displacement indications may be calibrated, if desired, into feed pressure and cutting pressure of the tool bit on the work piece.

Referring to Figs. 1 to 3, I have illustrated a measuring apparatus mounted as a machine tool force measuring gage for measuring the feed pressure and cutting pressure of a tool bit 10 as it axially moves along the surface of a rotating work piece 11 in order to cut a predetermined amount from the work piece 11 in a predetermined time which is indicated by the size of the shaving 12. The measuring apparatus includes a gage head indicated generally by the numeral 13 and a supporting member 14 which is held by a flat plate 15 in any suitable manner. The plate 15 is provided with an open groove portion 16 which in turn is adapted to cooperate with a tongue portion 17. This tongue portion is bolted to the gage supporting member 14 by a plurality of bolts 18 and cooperating nuts 19. Any suitable power means may be provided for moving the supporting member 14 and plate 15 along an axis parallel with the axis of rotation of the work piece 11, such as through a movable carriage or along any other suitable axis.

In order to provide an arrangement for giving an indication of the amount of displacement of the tool bit or the force acting thereon along any suitable number of axes, such as the horizontal and vertical axes, the gage head 13 is provided with a body portion or supporting tube 20 and a member or tube 21. As will be seen in Fig. 2 the body portion 20 and member 21 form two concentric tubular members each of which is supported by the supporting member 14. A recessed portion 22 is provided in one of the faces of the supporting members 14, in order to receive an end of the body member 20 which is tightly held in position by a plurality of bolts 23 which extend through bores 24 in the supporting member and thread into cooperating bores 25 in the body portion. Enlarged holes 26 connect with the bolts in order to provide a suitable aperture through which a tool may be placed for tightening the bolts 23 or loosening them when it is desired to remove the body portion from the supporting member. The tube 21 or rod may be supported in spaced relationship with the body portion 20 in any suitable manner, and in the arrangement illustrated in the drawings a portion of the tube extends into a cooperating bore 27 in the supporting member. The tube may be tightly held in the bore 27 in any suitable manner such as by providing a shrink fit between the tube and the surrounding surface of the supporting member which defines the bore 27. In order to provide an arrangement for conveniently holding the tool bit 10 by the gage head I provide a bore 28 in the tube 21. The tool bit may, therefore, be inserted in this bore 28 and tightly secured therein by a screw 29 which is provided in a threaded hole 30 in the tube 21. A cap 31 screws into a hole in the body 20 in registry with the hole 30 so as to provide a closure for the hole 30 which may accommodate a tool to tighten or loosen the screw 29. A cover 31' is also placed over the end of the body 20 and a portion of the tube 21, and this cover together with the cap 31 prevents any coolants which are played on the tool bit from entering the space between the body 20 and the tube 21. Furthermore, since heat from the tool bit may be transferred to the member 21, it may be made of any suitable material which has a minimum thermal coefficient of expansion, so as to minimize any inaccuracies in the gage. Also the gage may be calibrated to take into account any predetermined expansion of the parts. When the tool bit is held by the gage head and is then forced against the rotating work piece, as illustrated in Fig. 1, the gage being moved along an axis parallel with the axis of rotation of the work, the tool bit will be acted upon by a force, and since the member 21 is relatively flexible, the cantilever portion extending from the supporting member 14 will be moved a small amount in some direction. This force and movement may be resolved into components along suitable axes, such as along mutually perpendicular axes, which may be horizontal and vertical axes. In order to provide an arrangement for indicating the components of this force any suitable arrangement may be employed, and in the illustrated embodiment of my invention I provide a plurality of coil members 32 and 33, the coils 32 being on one axis, or a horizontal axis as seen in Fig. 3, and the coils 33 being on a vertical axis. These gage coils 32 and 33 may be of the conventional type and each includes a pair of coils 32, being wound around a cooperating core member 34, and the coils 33 being wound around a core member 35. Any suitable arrangement may be provided for changing the reactance of the coils in proportion to the force or displacement which is to be measured. Therefore, I provide a plurality of armatures 36 and 37 which are supported by the tube 21 in any suitable manner, such as by a plurality of bolts 38, so that the coils 32 and 33 may cooperate electromagnetically with the armatures 36 and 37. Instead of employing separate armatures the member 21 may be made of suitable magnetic material if desired. The armature 36 is mounted adjacent the gage coils 32 and the armature 37 is mounted adjacent the gage coils 33 so that movement of the tube relative to the body portion will move the armatures relative to the cooperating gage coils in order to vary the air gap therebetween and change the reactance of the coils. Thus, the change in air gap between the armature 36 and the cooperating gage coils 32 will give an indication of the component of force acting on the tool in a horizontal direction, and the change in the air gap between the armature 37 and its cooperating gage coils 33 will give an indication of the component of force acting on the tool in a vertical direction. The gage coils 32 and 33 may be supported on the body portion in any suitable manner, such as by plates 39 and 40, respectively, which are in turn held tightly against the outside surface of the body portion by a plurality of screws 41.

In order to provide an arrangement for indicating simultaneously these components of force acting on the tool bit, the gage coils 32 and 33 may be connected in any suitable circuits. Thus, as illustrated in Fig. 4 the gage coils 32 in series and here represented as a single winding may be connected in one arm of a bridge circuit through conductors 42. These conductors are accommodated in the bore 28 and a suitable connector 43 may be provided at the end of the bore in order to hold tightly the conductors therein so that no strain will result at the connection between the conductors and the gage coils. A balancing unit 44 is provided in another arm of the bridge and a reactor having portions 45 and 46 is provided for the other two arms of the bridge. The bridge is energized from a suitable source of power indicated at 47 which is connected at conjugate points of the bridge. The other conjugate points 48 and 49 are connected through a suitable rectifier arrangement indicated by the numeral 50 to a suitable indicating arrangement such as a galvanometer 51. As will be seen in Fig. 5 the gage coils 33 here represented as a single winding are connected in a circuit similar to that indicated in Fig. 4 so that a meter 51' may give an indication of the amount of displacement of the armature 37.

Thus, with the tool bit being out of engagement with the work 11, the tube 21 will be stationary with respect to the body portion 20 and air gaps of predetermined amounts will exist between the armatures and the cooperating cores of the gage coils. Through the arrangement of the balancing units, the bridge circuits shown in Figs. 4 and 5 may be balanced so that the meters 51 and 51' will indicate that there is a normal air gap at the gage coils or that predetermined conditions exist for the tool bit. However, upon moving the tool bit into engagement with the work 11 and starting the machine tool to operate so that the work 11 will rotate about an axis as indicated by the arrow and the gage head and tool bit will move in a direction parallel with the axis of rotation of the work in order that the bit will cut a shaving indicated by the numeral 12, the tool bit will be acted upon by a force which will in turn move the member 21 with respect to the body portion 20, the elastic characteristics of the member 21 being determined by the force which it must absorb so that the desirable displacement will be obtained. As a result of this force, the movement of the tool bit may be resolved into components along axes perpendicular to each other and one component will be indicated by the change in air gap between the coils 32 and armature 36 while the other component along the other axis will be indicated by the change in air gap between the gage coils 33 and their cooperating armature 37. These components along these two axes will be indicated separately and simultaneously by the meters or suitable indicators 51 and 51'. These indicators may, therefore, be calibrated to indicate displacement in some unit of distance, or by determining the amount of force necessary to move the bit a unit of distance the meters 51 and 51' may be used to indicate the horizontal and vertical components of the force acting upon the tool bit. Thus, the meter 51 may be made to indicate the feed pressure while the meter 51' may be used to indicate the cutting pressure of the tool bit.

In Fig. 6 I have illustrated a modification of my electric measuring apparatus illustrated in Figs. 1, 2, and 3 which has application to a machine tool force measuring gage and which includes the gage head indicated generally by the numeral 60 and a supporting member 61 which is held in any suitable manner such as by a flat plate 15 in a manner similar to the way in which the supporting member 14 is held by the flat plate 15 in Fig. 1. Here again any suitable power means may be provided for moving the supporting member 61 and plate 15 along any suitable axis, such as an axis parallel with the axis of rotation of the work piece which is adapted to cooperate with the tool bit 10. The gage head includes a body portion 62 and a bar member 63 which is adapted to support the tool bit in a hole 64, the bit being tightly held in the hole 64 by a cooperating screw 65. The rod 63 may be supported by the body portion 62 in any suitable manner, and in the arrangement illustrated in the drawings the members are concentrically arranged, the bar being supported near one end of the body portion 62 through a diaphragm 66 which has sufficient flexibility to allow movement of the bar 63 a suitable amount in the desired lateral directions. The diaphragm is tightly secured to the body portion 62 between a shoulder 67 and a lock nut 68, and the bar 63 is tightly held in the bore of the diaphragm in any suitable manner, such as by welding which is indicated by the numeral 69. A plurality of pins 67' may extend from holes in the body 62 into holes in the diaphragm 66 in order to absorb any torque. Any other suitable arrangement may be provided for mounting the rod member for limited relative movement with respect to the body member 62. In order to provide an arrangement for providing a reactive force on the bar member 63 on the opposite side of the supporting member 66 than the bit, which reactive force will be proportional to the force acting on the bit, I provide a suitable rod or resilient member 70 which is relatively tightly held in a bore 71 of the body member 62 and which extends into a bore 72 of the rod member 63. The resilient member 70 and the rod member 63 may be operatively connected together in any suitable manner, and in the arrangement illustrated in the drawings I provide a nut 73 which has threads in the outer surface thereof to cooperate with the threaded surface of the bore 72. This nut is also provided with a suitable arcuate shaped bore 74 through which extends the resilient rod member 70. A sufficient clearance is provided between the resilient member 70 and the smallest portion of the bore 74 so that the rod may be received thereby when the rod member 63 is inserted in the body portion 62.

Figure 7:
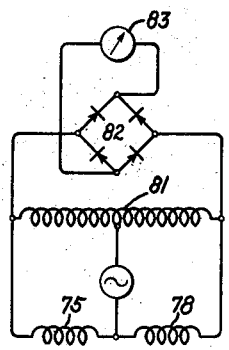

In order to measure the component of the force acting on the tool bit 10 in a direction perpendicular to the direction of bodily movement of the gage device, which will be a vertical direction if the gage device is mounted for movement in the horizontal direction, I provide a gage coil 75 which is mounted on the body portion 62 through a bolt 76 and nut 77. The bolt 76 may be made of suitable magnetic material so that it will provide a core member for the coil 75. Also by making the bolt member 76 of suitable dimensions and by rotating the nut 77 the air gap between the resilient member 70 and the cooperating end of the bolt 76 may be adjusted. A gage coil 78 similar to the coil 75 may be placed on a diametrically opposite side of the resilient member 70 supported by a bolt 79 and a nut 80 so that when the air gap between the resilient member 70 and the core 76 is increased the gap between the core 79 and the resilient member 70 will be decreased. These gage coils may be suitably connected in a circuit as illustrated in Fig. 7 so as to measure the change in reactance of the coils due to the change in air gap. Thus the coils 75 and 78 are serially connected together in circuit with a reactor 81 to form the four arms of a bridge circuit. A suitable source of alternating current is connected between the coils 75 and 78 and the mid-point of the reactor 81 and the opposite conjugate points of the bridge circuit are connected through a suitable rectifier indicated by the numeral 82 to a suitable meter 83 which may be calibrated to read in units of force.

In order to measure the component of force along an axis parallel with the axis of movement of the gage head 60, a gage coil 84 is placed along such an axis which is similar to the gage coils 75 and 78 and which has a core member for cooperating with the relatively resilient member 70. A similar gage coil is provided on a diametrically opposite side of the resilient member 70, its supporting bolt and core member being shown at 85, these two latter gage coils being connected in a circuit similar to that illustrated in Fig. 7 for measuring the tool feed pressure. In order to provide an arrangement for cooperating magnetically with the cores, the rod 70 may be made of suitable magnetic material, or the portion thereof adjacent the cores, or armatures similar to 36 and 37 may be suitably carried by the rod 70.

It will be seen that with the tool pressure force measuring gage as illustrated in Fig. 6, the inside of the body portion 62 is effectively sealed from any coolants which are applied to the tool bit 10 and the range of operation of the electric measuring device may be varied by merely varying the amount of reactive force necessary to be absorbed through the relative resilient member 70. Thus, the force acting on the tool bit times the distance between the point where the force is applied and the diaphragm 66 will be equal to the distance between that diaphragm and the point of contact between the nut 74 and the bar 70 times the force which must be applied through the bar 70 so as to prevent continued movement of the rod 63 around the supporting member 66. It will be seen that by removing the lock nut 68 and removing the rod 63 access may be had to the nut 73 and it may be moved to any suitable position within the bore 72 so as to control the moment arm of the reactive force acting through the resilient rod 70. In this manner the force range of my improved electric measuring device may be adjusted. It will be apparent that the rod 70 may have suitable elastic characteristics so that the cantilever portion will flex a suitable amount under a predetermined force. It will also be seen that in the structure illustrated in Fig. 6 any inaccuracies due to heat from the tool bit are minimized since there is no continuous heat conductive path from the member 63 to the resilient member 70.

Instead of employing a change in air gap in a magnetic circuit electromagnetically associated with the gage coil for changing the reactance thereof, any other suitable arrangement may be provided.

In view of the foregoing, it will be seen that I have provided an improved electric measuring device for simultaneously indicating the various components of a force acting on a member along any suitable number of axes. Thus, my improved electric measuring device may be employed as a machine tool force measuring or pressure gage for indicating separately and simultaneously the feed pressure and cutting pressure of the tool bit. It is to be understood, however, that my improved gage construction may be employed with any other suitable type of measuring apparatus for giving a continuous indication of the various components along suitable axes of a force applied to a body.

Although I have shown and described particular embodiments of my invention, I do not desire to be limited to the particular embodiments described, and I intend in the appended claims to cover all modifications which do not depart from the spirit and scope of my invention.

What I claim as new and desire to secure by Letters Patent of the United States is:

1. Apparatus for obtaining measurements indicative of the feed and cutting pressures to which a lathe tool is subjected during cutting in a rotating work piece, comprising a supporting structure adapted to be carried on a lathe carriage so as to have the usual feed and cutting movements relative to a work piece, a stiffly resilient rod rigidly supported at one end in said supporting structure, a lathe cutting tool movably carried in said supporting structure in cutting relation to the work and in force transmitting relation to said rod so as to cause said rod to be bent in one direction in proportion to the feed pressure on said tool and in a direction perpendicular to the first mentioned direction in proportion to the cutting pressure on said tool, a pair of variable reactance devices having stationary parts carried by said structure adjacent to said rod and having magnetic armature means carried by and moved by the bending of said rod in said two directions to vary one reactance by one direction of bending and the other reactance by the other direction of bending and a pair of reactance responsive circuits in which said variable reactances are respectively connected for obtaining measurement of the bending of said rod in terms indicative of the feed and cutting pressures to which said cutting tool is subjected.

2. In an electric measuring device, a tubular body portion, a bar member having a bore extending through a portion thereof, means for mounting said bar member within said body portion for relative lateral movement, a resilient member carried by said body member and extending into said bore, means for operatively connecting a portion of said resilient member within said bore to said bar member, relative movement between said bar member and said body portion causing relative movement between said resilient member and said body portion, and electromagnetic means for measuring the amount of said last-mentioned movement.

3. In an electric measuring device, a tubular body portion, a plurality of gage coils supported by said body portion, a bar member having a longitudinally extending bore, means for mounting said bar member within said body portion for limited lateral movement, a resilient member carried by said body member and extending into said bore, means for operatively connecting a portion of said resilient member within said bore to said bar member, relative movement of said bar member and said body portion causing relative movement between said resilient member and said body member, and means including said gage coils for measuring the amount of said last-mentioned movement.

4. In an electric measuring device, a tubular body portion, a plurality of gage coils supported by said body portion on mutually perpendicular axes, a bar member adapted to be acted upon by a force, said bar member having a bore extending through a portion thereof, means for mounting said bar member within said body portion for limited lateral movement, a resilient member carried by said body portion and having a portion extending into said bore and a portion of magnetic material adapted to cooperate with said coils, and a nut having threaded engagement with the surface of said bore and having a hole therethrough, said resilient member extending through said hole in said nut for operatively connecting said bar to said resilient member, action of the force on said bar member causing relative movement between said magnetic portion and said gage coils.

5. In an electric measuring device, a tubular body portion, a bar member having a bore extending through a portion thereof, means for mounting said bar member within said body portion for relative lateral movement, a resilient member carried by said body member and extending into said bore, means for operatively connecting a portion of said resilient member within said bore to said bar member, relative movement between said bar member and said body portion causing relative movement between said resilient member and said body portion, and electromagnetic means for measuring the amount of said last-mentioned movement, said operatively connecting means being adjustable so as to vary the range of said measuring device.

6. In an electric gage, an elongated hollow tubular member adapted to be secured at one end in fixed relation to a tool carriage, a cutting tool extending from the other end of said member in work-cutting relation, tool holding means extending concentrically within said tubular member and providing resilient connection therewith for holding said tool with sufficient rigidity to permit of normal cutting operations but allowing slight universal movement of said tool holding means laterally of the axis of said tubular member in proportion to the lateral forces exerted on said tool and in a direction dependent upon the direction of such forces, and gage coils supported within said tubular member on radial axes at right angles to each other adjacent to but out of contact with said tool holder, and magnetic armature means carried by said tool holder adjacent said coils for varying the reactance of the gage coils in accordance with the movement of said tool holder.

HANS P. KUEHNI